Dec. 15, 1953  D. E. SUNSTEIN  2,662,978
LOGARITHMIC TRANSDUCER
Filed June 11, 1946  3 Sheets-Sheet 1
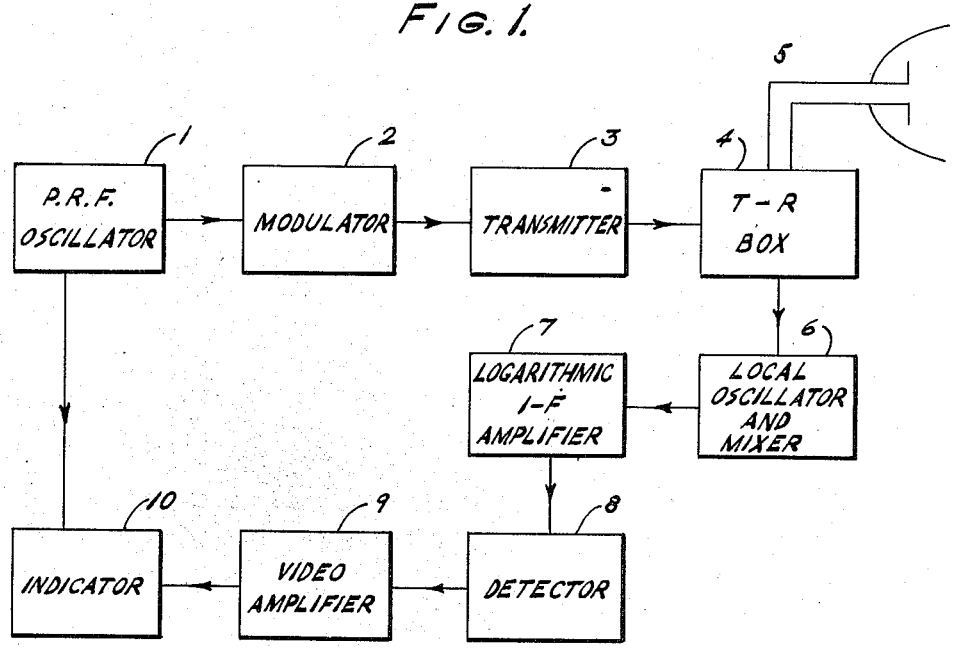
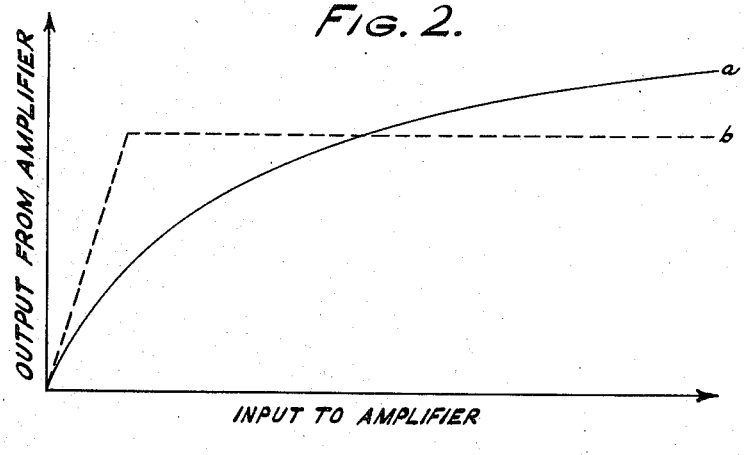
INVENTOR.
DAVID E. SUNSTEIN
BY
AGENT

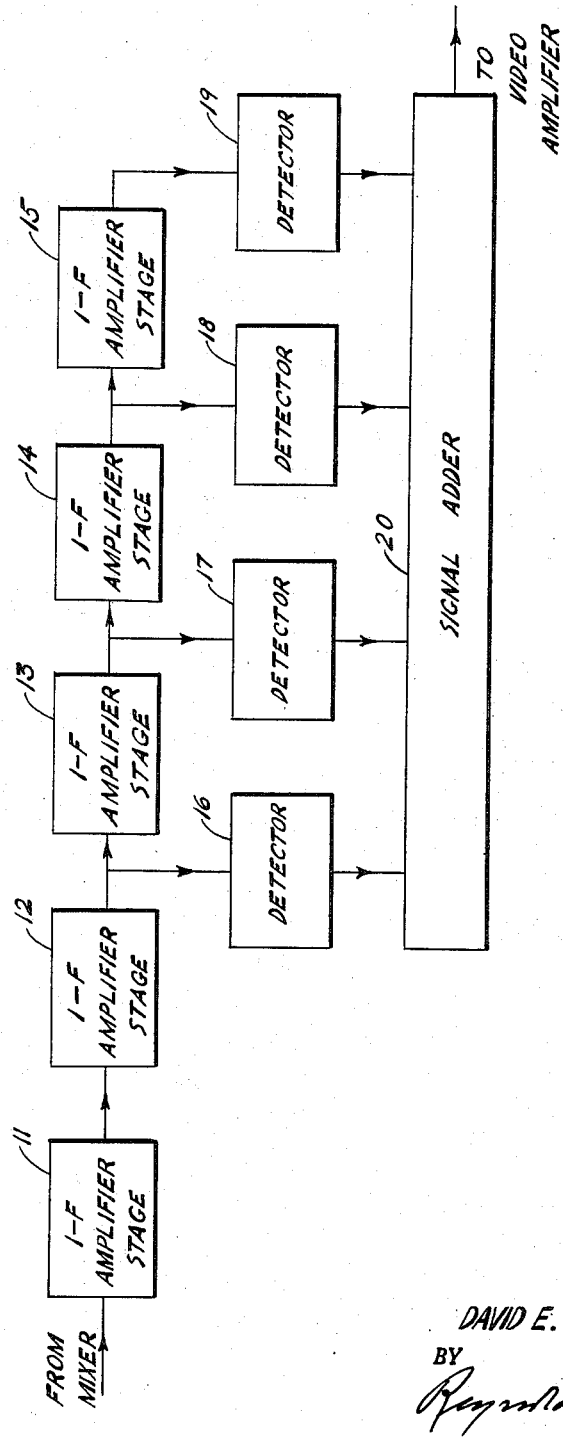

INVENTOR.
DAVID E. SUNSTEIN

Patented Dec. 15, 1953

2,662,978

UNITED STATES PATENT OFFICE 2,662,978

LOGARITHMIC TRANSDUCER

David E. Sunstein, Cynwyd, Pa., assignor to Philco Corporation, Philadelphia, Pa., a corporation of Pennsylvania Application June 11, 1946, Serial No. 675,848

9 Claims. (Cl. 250—20)

This invention relates to methods of and means for improving the performance of radar systems. More specifically it relates to improved amplifier and detector circuits which are adapted to preserve a substantially greater portion than has heretofore been possible of the intelligence contained in the signals received by a radar system. It is thereby adapted to make possible the obtaining of improved indications of the nature of terrain and of the various distinctive features thereon by means of the radar system when using a conventional indicator of the cathode ray tube variety such as is customarily employed to translate the received radar signals into sensible form.

In prior art radar systems, and particularly in those for airborne use, where the number of stages of intermediate frequency amplification which can be used in practice is limited by considerations of weight and bulk, it has been observed that, owing mainly to the saturation of the intermediate frequency amplifier which usually forms a part of the radar system, it is only possible to obtain a picture or reproduction of the terrain observed which is essentially limited to two tones (i. e. black and white). In other words, certain objects, the reflectivity of which exceeds a certain minimum value, will produce bright areas or spots on a cathode ray indicator; while other objects whose reflectivity is less than this minimum level will produce only black areas on the indicator. Few if any intermediate tonal gradations are obtainable. This makes it exceedingly difficult to interpret the indications as a whole and to distinguish between objects of different sizes and reflectivities despite the fact that, in the signal as received from the various target objects, is contained the necessary intelligence to make this possible.

Various attempts to correct this difficulty have been made in the past, but none of these has proven to be very satisfactory. One approach to a solution of the problem involves the use of two intermediate frequency amplifiers operating in parallel, each having a different overload level and different maximum output. The outputs of these two amplifiers are, in effect, added, and the sum is supplied to the video circuits and indicator of the radar system. By suitable adjustment such an arrangement can be made to provide a three-tone picture instead of the usual two-tone one. Then all signals below a certain level will appear black on the indicator; all between this level and a second level will appear gray; and all above the second level will appear white. It is necessary to adjust such a system in accordance with the average signal strength, and if this varies, as it may in the case of an airborne equipment progressing toward a selected target area, the equipment must be adjusted to a new average signal level if full advantage is to be taken of its capabilities. Such a system is obviously limited; it will not, for example, distinguish between targets of different reflectivity which produce signals, the intensities of which are between the same two signal levels. Although an approximate separation of such targets can be effected by manually varying the gain control, this is exceedingly inconvenient and is no substitute for a direct indication.

It is the principal object of the invention to overcome this defect of prior systems by providing a method of and means for conserving the intelligence present in received radar signals whereby this intelligence may be reproduced on a cathode ray tube or other suitable indicator so as to provide maximum discrimination among targets of different characteristics.

Another object is to provide an improved amplifier and detector combination adapted to preserve the intelligence contained in radar and like signals.

Another object is to provide an improved amplifier and detector combination having a substantially logarithmic output versus input characteristic.

A further object of the invention is to provide a novel amplifier and detector combination, the detected output of which is a faithful reproduction of the modulation of the input signal regardless of the strength of the input signal and variations therein.

Other objects and advantages of the invention will become apparent as the detailed description of my invention proceeds with reference to the accompanying drawings in which:

Figure 1 is a generalized block diagram of a typical radar system embodying the invention.

Figure 2 illustrates graphically the output versus input characteristic of an amplifier in accordance with the invention, and compares it with the like characteristic for a conventional radar intermediate frequency amplifier.

Figure 3 is a generalized block diagram of an amplifier and detector in accordance with the invention.

Figure 4:
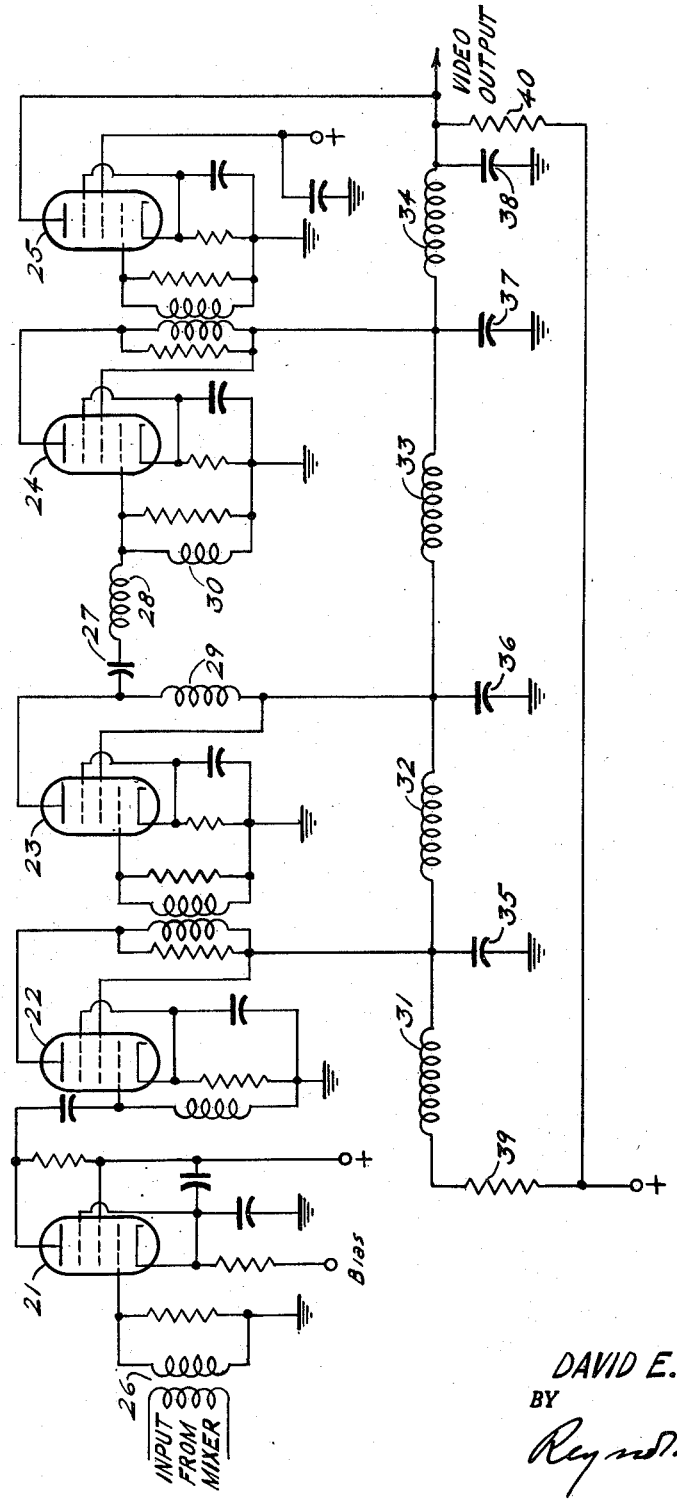
Figure 4 is a schematic diagram of an amplifier and detector in accordance with the invention.

Assuming the terrain and objects thereon to be observed by a radar to have the same coefficient of reflection, regardless of the angle from which they are viewed, then regardless of the fact that the strength or amplitude of signals returned from targets of like characteristics will vary depending on their ranges, the percentage modulation of these signals will always be the same. If this percentage modulation can be maintained throughout the radar receiving system, an indication will result which faithfully reproduces the differences in characteristics of various targets. I have determined that an amplifier or transducer in which the output is substantially proportional to the logarithm of the input signal is best adapted to preserve this characteristic of the received signal, while at the same time permitting the use of a reasonably small number of tubes. This characteristic is represented by the solid line $a$ in Figure 2, while the characteristic for an ordinary I.-F. amplifier is represented by the broken line $b$. Such a device will have an output which is proportional to the percentage modulation of the input signal. It preferably should occupy a position in the receiver in advance of that at which any overloading or limiting effect occurs.

In Figure 1 there is illustrated the application of such a logarithmic I.-F. amplifier to a typical radar system, generally represented in block form. The P. R. F. oscillator 1 generates time-spaced pulse signals periodically recurrent at a rate which is primarily determined by the maximum range of target with which the equipment is to be used. These pulses are supplied through modulator 2 to control the generation by transmitter 3 of pulses of high frequency energy preferably in the microwave range. These high frequency pulses are supplied through a conventional T—R box 4 to antenna 5 for transmission into space. Reflections thereof from target objects likewise may be intercepted by antenna 5, and are transmitted through T—R box 4 to local oscillator and mixer 6, the output of which may be supplied to logarithmic I.-F. amplifier 7. The output of logarithmic amplifier 7, which will contain substantially all of the intelligence present in the signal supplied to its input, is supplied to a suitable detector 8, the detected output of which is amplified in video amplifier 9. Rectified pulses corresponding to object-reflected transmitted pulses from the output of video amplifier 9 and pulses from P. R. F. oscillator 1 are both supplied to a suitable indicator 10 to provide an indication of either target range or direction, or both. In the system as above described all of the components may be conventional with the exception of logarithmic amplifier 7 and detector 8. These are in accordance with the invention hereinafter described. However, it is to be noted that the combination, with a radar system of the sort characterized above, of a logarithmic transducer cooperating in the manner above set forth constitutes a separate invention which is claimed in my copending application Serial No. 793,741, filed December 24, 1947, as a division of this application.

Amplifiers having substantially logarithmic characteristics are well known in the art in a number of forms. Thus, for example, it might be possible to obtain such a characteristic by employing instantaneous automatic gain control on at least several stages of the intermediate frequency amplifier of a superheterodyne radar receiver. However, in order to prevent undesirable transient response to bursts of input signal, the build-up and decay time of the gain-controlling signal must be made substantially less than the reciprocal of the high cut-off frequency of the accompanying video amplifier. This is not readily done, so that in general there will be a loss of intelligence, particularly in respect to signals representing variations in the characteristic of the terrain or land mass forming the background of the radar indication. Furthermore, for each I.-F. amplifier tube to which gain control is applied, at least two additional tube sections are required which, in addition to increasing considerably the size and complexity of the circuits, will also have the effect of reducing the gain on weak signals, or the bandwidth, owing to the introduction of additional shunt capacity.

I prefer, therefore, to utilize a special form of combined amplifier and detector devised by me which is generally represented in the block diagram of Figure 3. In this diagram are shown a plurality of intermediate frequency amplifier stages 11—15, each of which, except the first stage 11 and the last stage 15, receives signal from the preceding stage and supplies its output to the immediately following stage. The first stage 11 may be supplied with signal from local oscillator and mixer 6 of the radar system shown in Figure 1. Preferably there are employed the maximum number of stages which can be used without producing an objectionable noise level in the final stage in the absence of input signal from the mixer stage or other source. The outputs of at least some of the I.-F. amplifier stages (namely 12—14 in the arrangement shown), in addition to being supplied to the immediately succeeding stages, are also supplied to separate detector stages 16, 17 and 18. The output of amplifier stage 15 is supplied to an additional detector 19. Preferably detectors are thus provided for every amplifier stage which will overload for an input signal of the maximum intensity with which the circuit is expected to be used. These individual stages are arranged so that, as the amplitude of the signal supplied to the input of stage 11 increases, successive stages, commencing with stage 15 and proceeding in the direction of stage 11, will overload. The circuits are so arranged that, when a given stage overloads, the detector receiving its input signal from the preceding stage, will commence to function. Thus, for example, when stage 14 overloads (stage 15 having previously overloaded) detector 17 will commence to detect the signal supplied to it from amplifier stage 13. Thus it will be seen that the number of detectors in operation and providing detected output will depend upon the number of overloaded stages in the intermediate frequency amplifier. The outputs of all detectors are fed to a signal adder 20 in which they are combined to produce a signal which will be substantially the logarithm of the input signal to stage 11. Preferably the signal adder should contain suitable means for delaying by differing amounts the signals supplied by the several detectors, in order that compensation may be made for the transit time through the several amplifier stages and therefore the contributions of all detectors be in phase. This is particularly important when the durations of pulse signals with which the amplifier is to operate are of the order of the transit time of signals through the amplifier. The output of signal adder 20 may be supplied to the video amplifier 9 of the radar system according to Figure 1.

Although, as shown, these detectors may be separate and distinct from the I.-F. amplifier stages from which they receive their input signals, it is generally preferable to combine them with the respective amplifier stages so that each amplifier tube will perform a dual function as an amplifier and a detector. When this is done each amplifier stage, as it overloads, itself commences to function as a detector. The several stages may be made to function in accordance with any of the well known methods of detection. For example, they may be operated as either grid leak or cathode follower detectors, in which event it will be necessary to provide means for isolating the detected output of each of the stages from the others. This will either result in a loss of gain or require additional tubes. It is, therefore, preferable to operate the stages as plate or screen detectors and to maintain low D. C. grid circuit impedances. The plate currents of the amplifier tubes will then increase until the amplitudes of the signals applied to their grids become great enough to operate them over an appreciable part of the curved portion of the grid voltage versus plate current characteristics. If, then, a video load impedance is placed in the plate and/or screen circuits of each stage, in addition to whatever impedance to intermediate frequency is already present, there will be developed across this video load impedance a video signal output when the signal on the grid of the stage reaches a predetermined magnitude.

In the schematic diagram of Figure 4, is shown an amplifier in accordance with the invention employing both plate and screen detection and comprising five stages consisting respectively of tubes 21—25. Input signal such as that from local oscillator and mixer 6 of the typical radar system shown in Figure 1 is supplied through transformer 26 to the control grid of the first amplifier tube 21. This tube is not connected to operate as a detector, but its output is supplied through conventional condenser coupling means to the control grid of tube 22. Tubes 22, 23 and 24 are connected to operate as both plate and screen detectors. Tube 25 in the final stage, however, operates only as a plate detector. Although any of the stages may be operated solely as either plate or screen detectors, it is preferable to use a combination of both of these methods of detection, particularly when the output impedance of a stage at intermediate frequency is high, in which event the stage will operate relatively inefficiently as a plate detector. Although, under these circumstances, it will operate rather efficiently as a screen detector, I have found that a combination of both methods yields optimum results in most instances. The load impedance for tubes 22, 23, 24 and 25 comprises the delay line composed of inductors 31—34, condensers 35—38, and terminated at both its ends in impedances 39 and 40. Both of these impedances are preferably of the order of magnitude of the characteristic impedance of the delay line in order to minimize reflections at the ends thereof of signals propagated therein. Connections from the different stages to various points on the delay line provide for the necessary delay of the outputs from the different stages, required, as hereinbefore mentioned, because of the finite transit time through the several stages. Plate and screen voltages for tubes 22—25 are also supplied through a common connection from impedances 39 and 40 to a source of potential. The couplings between the several amplifier stages, for intermediate frequency signals, may be in the form of conventional double-tuned circuits as shown between tubes 22 and 23 and between tubes 24 and 25. However, in the embodiment shown there is illustrated, between tubes 23 and 24, a simpler but rather effective coupling which I regard as part of my invention. In this arrangement, which is essentially a single-tuned circuit in which inductors 29 and 30 are tuned respectively by the capacities of tubes 23 and 24, to the I.-F., there is also provided a connection between the plate of tube 23 and the grid of tube 24 which is a series resonant circuit consisting of condenser 27 and inductor 28 likewise tuned to a frequency in the neighborhood of the intermediate frequency. By this means a low impedance and good transfer for intermediate frequency signals is provided between tubes 23 and 24. However, for video frequencies this connection will represent a substantial impedance and will permit video signals to be developed in the common plate and screen grid load impedances of tube 23 formed by the delay line. It is to be understood that this form of coupling could be used between other stages of the amplifier, although, in the embodiment as constructed and as illustrated in Figure 4, it was used only between the two stages referred to.

In operation and with the delay line properly adjusted, output from one or more of the several detector circuits, depending upon the number of stages which are overloaded, will appear in proper phase relation across impedance 40, and may, for example, be supplied as video output to video amplifier 9 of the radar system shown in Figure 1.

Although the invention has been described with reference to certain representative embodiments, it is by no means limited thereto but only as its scope is defined by the appended claims. Thus, for example, the amplifier shown in the schematic of Figure 4 is but one possible arrangement, as used in a particular radar system, in which it was found desirable to cause certain stages to function as combined plate and screen detectors, one stage to function as a plate detector, and to use different forms of coupling between the different stages. Clearly any stage might, within the scope of the invention, have been made to function as a grid-, plate-, screen- or cathode-load-detector or as a combination of any two or more of these.

I claim:

1. In an electrical signal transducer for use with modulated carrier wave signals, a series of cascaded amplifying stages for said modulated signals, means for causing each of a plurality of said stages to function as a detector in response to modulated signals in excess of a predetermined level in said stage to yield a separate detected output, a delay line terminated in impedances adapted to minimize reflections therein and having thereon a series of spaced taps, means supplying said detected outputs produced by successive stages of said series of stages to successive taps of said delay line, said delay line providing a delay between each pair of successive taps thereof which is substantially equal to the inherent signal delay existing between those points in said amplifying stages from which separate detected signals are supplied to said pair of delay line taps, and means deriving from said delay line an output signal which is substantially proportional to the sum of the outputs of said stages which function as detectors.

2. In a multi-stage transducer for carrier waves of frequencies within a relatively high frequency range modulated by signals comprising components of relatively lower frequency, a stage comprising a vacuum tube having an output circuit, an impedance included in said output circuit for developing thereacross an appreciable modulated high frequency signal, means comprising a second impedance included in said output circuit for developing a detected signal containing said lower frequency components, and means comprising a circuit series resonant at a frequency within said high frequency range and serially connected between said stage and a succeeding stage for transferring the modulated signal developed across said first impedance to said succeeding stage while substantially preventing transfer of said lower frequency detected signal.

3. In an electrical signaling system, a source of a high frequency signal modulated by a signal comprising relatively lower frequency components, a vacuum tube having input and output electrodes, said vacuum tube having a characteristic which is substantially linear for signals of less than predetermined amplitude applied to said input electrode and which is non-linear for signals of greater than said predetermined amplitude so applied, means for supplying said modulated signal to said input electrode, an output circuit connected to said output electrode, said circuit including an impedance which is of substantial magnitude for said high frequency and also an impedance which is of substantial magnitude for said lower frequency components, whereby amplified signals at said high frequency are developed across said first impedance in response to modulated signals of less than said predetermined amplitude and detected signals corresponding to said lower frequency components are developed across said second impedance in response to modulated signals of greater than said predetermined amplitude, and separate connections for deriving said amplified and detected signals respectively from said output circuit.

4. In an electrical signal transducer for use with modulated carrier wave signals, a series of cascaded amplifying stages forming a signal path for said modulated signals, a plurality of means, each responsive to modulated signals in excess of a predetermined level in one of said stages for developing a separate detected signal, a signal adder responsive to input signals supplied thereto to produce a resultant signal substantially proportional to the sum of said input signals, means delaying said separate detected signals by different amounts, and means providing simultaneously operative signal paths additional to and separate from said first-named signal path for supplying each of said detected signals to said signal adder as an input signal, each of said signal paths having a gain which is substantially less than that of the amplifying stage whose detected signal is supplied thereby.

5. In an electrical signal transducer for use with modulated carrier wave signals, a series of cascaded amplifying stages of finite transit times forming a signal path for said modulated signals, each of a plurality of said stages operating as a detector in response to modulated signals in excess of a predetermined level in said stage to yield a separate detected output, means delaying the outputs of each of said detector stages by an amount proportional to the combined transit times of those amplifier stages following it, a signal adder responsive to input signals supplied thereto to produce a resultant signal substantially proportional to the sum of said input signals, and means providing simultaneously operative signal paths additional to and separate from said first-named signal path for supplying each of said delayed detected outputs to said adder as an input signal, each of said signal paths having a gain which is substantially less than that of the amplifying stage whose detected signal is supplied thereby.

6. In an electrical signal transducer for use with modulated carrier wave signals, a series of cascaded amplifying stages forming a signal path for said modulated signals, a plurality of said stages comprising vacuum tubes having at least triode elements, means causing each of a plurality of said stages to function as a plate detector delivering a separate detected output in response to modulated signals in excess of a predetermined level in said stage, a signal adder responsive to input signals supplied thereto to produce a resultant signal substantially proportional to the sum of said input signals, means delaying said detected signals by different amounts, and means providing simultaneously signal paths additional to and separate from said first-named signal path for supplying each of said detected outputs to said signal adder as an input signal, each of said signal paths having a gain which is substantially less than that of the amplifying stage whose detected signal is supplied thereby.

7. In an electrical signal transducer for use with modulated carrier wave signals, a series of cascaded amplifying stages forming a signal path for said modulated signals, a plurality of said stages comprising screen grid vacuum tubes, means causing each of a plurality of said stages to function as a screen detector delivering a separate detected output in response to modulated signals in excess of a predetermined level in said stage, a signal adder responsive to input signals supplied thereto to produce a resultant signal substantially proportional to the sum of said input signals, means delaying said separate detected signals by different amounts, and means providing simultaneously operative signal paths additional to and separate from said first-named signal path for supplying each of said detected signals to said signal adder as an input signal, each of said signal paths having a gain which is substantially less than that of the amplifying stage whose detected signal is supplied thereby.

8. In an electrical signal transducer for use with modulated carrier wave signals, a series of cascaded amplifying stages forming a signal path for said modulated signals, at least one of said stages comprising a screen grid vacuum tube, means causing each of a plurality of said stages to function as a detector delivering a separate detected output in response to modulated signals in excess of a predetermined level in said stage, at least one of said screen grid tubes functioning as both a plate and a screen detector, a signal adder responsive to input signals supplied thereto to produce a resultant signal substantially proportional to the sum of said input signals, means delaying said separate detected signals by different amounts, and means providing simultaneously operative signal paths additional to and separate from said first-named signal path for supplying each of said detected outputs to said signal adder, each of said signal paths having a gain which is substantially less than that of the amplifying stage whose detected signal is supplied thereby.

9. In an electrical transducer for carrier waves of relatively high frequency modulated at relatively lower frequencies, a series of cascaded amplifying stages forming a signal path for said modulated waves, means causing each of a plurality of said stages to function as a detector to produce signals of said lower modulation frequencies in response to modulated signals in excess of a predetermined level in said stage, means comprising a circuit series resonant at a frequency substantially equal to said carrier wave frequency and serially connected between one of said detecting stages and a succeeding stage for transferring said modulated high frequency signal between the stages connected thereby while substantially preventing transfer of said lower frequency detected signals, a signal adder responsive to input signals supplied thereto to produce a resultant signal substantially proportional to the sum of said input signals, means delaying said lower frequency detected signals by different amounts, and means providing simultaneously operative signal paths additional to and separate from said first-named signal path for supplying each of said lower frequency detected signals to said signal adder as an input signal, each of said signal paths having a gain which is substantially less than that of the amplifying stage whose detected signal is supplied thereby.

DAVID E. SUNSTEIN.

References Cited in the file of this patent

UNITED STATES PATENTS

| Number | Name | Date |
|---|---|---|
| 1,401,644 | Rice | Dec. 27, 1921 |
| 1,465,250 | Brillomin | Aug. 21, 1923 |
| 1,477,017 | Sprague | Dec. 11, 1923 |
| 1,986,597 | Nyman | Jan. 1, 1935 |
| 2,014,509 | Roosenstein et al. | Sept. 17, 1935 |
| 2,058,512 | Rust | Oct. 27, 1936 |
| 2,167,492 | Sproule | July 25, 1939 |
| 2,196,266 | Landon et al. | Apr. 9, 1940 |
| 2,249,181 | Shepard | July 15, 1941 |
| 2,261,803 | Grundmann | Nov. 4, 1941 |
| 2,262,841 | Goddard | Nov. 18, 1941 |
| 2,301,268 | Gehman | Nov. 10, 1942 |
| 2,329,570 | Wellenstein et al. | Sept. 14, 1943 |
| 2,403,527 | Hershberger | July 9, 1946 |
| 2,422,069 | Bedford | June 10, 1947 |
| 2,515,187 | Bliss | July 18, 1950 |